United States Patent
Takeuchi et al.

[11] 4,051,513
[45] Sept. 27, 1977

[54] COLOR IMAGE PROJECTING APPARATUS

[75] Inventors: Kouichi Takeuchi, Kamakura; Norio Itoh, Tokyo; Kuniyoshi Koyama, Chofu; Satoshi Shimada, Yokohama; Masami Himuro, Tokyo, all of Japan

[73] Assignee: Sony Corporation, Tokyo, Japan

[21] Appl. No.: 664,256

[22] Filed: Mar. 5, 1976

[30] Foreign Application Priority Data

Mar. 12, 1975 Japan .................... 50-29710

[51] Int. Cl.² .......................... G03B 21/00
[52] U.S. Cl. .......................... 358/60; 313/2; 358/64
[58] Field of Search ............ 313/2, 409, 413, 415; 358/60, 64

[56] References Cited
U.S. PATENT DOCUMENTS 2,480,848  9/1949  Geer .................... 313/2 X Primary Examiner—Rudolph V. Rolinec
Assistant Examiner—Darwin R. Hostetter
Attorney, Agent, or Firm—Lewis H. Eslinger; Alvin Sinderbrand

[57] ABSTRACT

A color image projecting apparatus having three cathode ray tubes which produce different respective color images and including two projecting lenses. A first primary color image reproduced on a first cathode ray tube is projected on a screen through a first projecting lens, and second and third primary color images reproduced on second and third cathode ray tubes, respectively, are synthesized by a dichroic mirror and then projected on the screen through a second projecting lens. In this case, the projecting axes of the first and second projecting lenses are arranged to converge two images passed therethrough on the screen.

6 Claims, 3 Drawing Figures 4,051,513

COLOR IMAGE PROJECTING APPARATUS

BACKGROUND OF THE INVENTION

1. Field of the Invention

This invention relates generally to a color image reproducing apparatus, and more particularly, to a color image projecting apparatus using three cathode ray tubes as image sources.

2. Description of the Prior Art

It is known in the art to use three cathode ray tubes each of which produces a different primary color image to be projected on a screen as a color image.

A prior art color projector has been proposed in which monochrome cathode ray tubes, provided with red, green and blue primary color phosphors, are driven with red, green and blue color signals to produce three respective primary color images. The three primary color images are projected through a projecting lens apparatus which converges them on a screen to reproduce a color image thereon in enlarged scale. Since the incident angles of three the light images at the screen are so different, the use of a high gain (high directivity) screen results in a color shading depending upon viewing position. Accordingly, it is necessary to use a low gain (low directively) screen so that sufficient luminance or brightness cannot be obtained. Furthermore, in the prior art color projector, due to the fact that the optical paths from the respective cathode ray tubes to the screen are different and their projecting angles on the screen also are different, keystone distortion must be corrected to obtain registration over the screen. In addition, when the size of a picture on the screen is changed, it is necessary to correct the keystone distortion, the position of the picture, the focal position of the projecting lens apparatus, the optical axes thereof and the optical axes of the cathode ray tubes, which is troublesome and requires complicated optical apparatus, electrical circuitry and difficult adjustments. Moreover, the prior art color projector requires a three lens system, which is expensive.

It is also known in the art to use a pair of crossed dichroic mirrors disposed in front of three cathode ray tubes for synthesizing a three color image therefrom and projecting the synthesized image on a screen through a single lens. In this case, the light axes of three cathode ray tubes coincide with each other; however, owing to light loss through and on the dichroic mirrors, the color image projected on the screen cannot have sufficient brightness.

Furthermore, since the viewing angles of the cathode ray tubes to the dichroic mirrors are rather large, the permeable or reflection characteristics of the dichroic mirrors are much different at the centers and at the ends of the dichroic mirrors and accordingly considerable color shading appears.

SUMMARY OF THE INVENTION

It is an object of this invention to provide a color image projecting apparatus which can reproduce a color image having a sufficient brightness on a screen.

It is another object of this invention to provide a color image projecting apparatus which is easy to adjust.

It is a still further object of this invention to provide a color image projecting apparatus which can reduce the color shading of a color image projected on a screen.

In accordance with the present invention, a color image projecting apparatus is provided having first, second and third cathode ray tubes, each producing a respectively different primary color image. A first projecting lens is provided for projecting the primary color image produced by the first cathode ray tube on a screen. The two primary color images produced by the second and third cathode ray tubes are synthesized, or combined in registration, by a dichroic mirror and thereafter projected on the screen through a second projecting lens. The projecting axes of the first and second projecting lenses are arranged so that two images projected by the first and second projecting lenses are converged at the screen.

Other objects, features and advantages of the present invention will become apparent from the following description taken in conjunction with the accompanying drawings.

DESCRIPTION OF THE PREFERRED EMBODIMENTS

An embodiment of the present invention will be hereinafter described with reference to the drawings.

Figure 1:
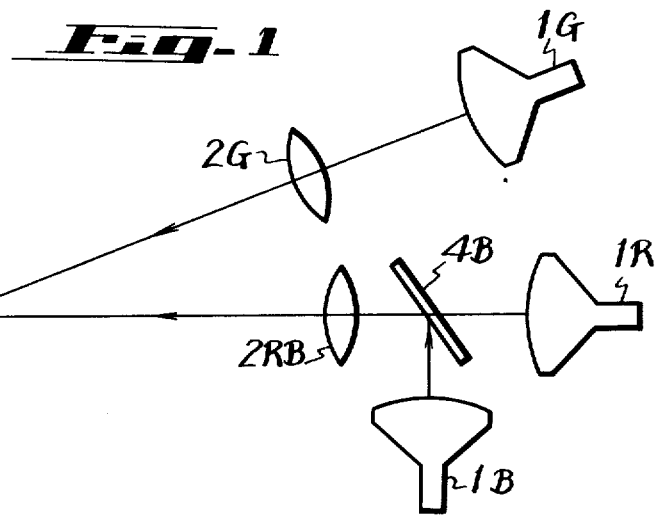
FIG. 1 is a schematic diagram showing a color image projecting apparatus according to the present invention.

FIG. 1 shows an embodiment present of the invention. In FIG. 1, a cathode ray tube 1G which is operative to emit a green color image is used as an independent image source. The color image reproduced by the cathode ray tube 1G is projected through a lens apparatus 2G on a screen 3, while color images reproduced on cathode ray tubes 1R and 1B are synthesized by a dichroic mirror 4B. The image synthesized by the dichroic mirror 4B contains red and blue color components and is projected through a lens apparatus 2RB onto the screen 3. Thus, a color image can be reproduced on the screen in enlarged scale.

Since the color projector of the present invention is a two lens, three cathode ray tube system, it has the following advantages as compared with the prior art three lens, three cathode ray tube system or one lens, three cathode ray tube.

The advantages of the invention as compared with the prior art three lens, three cathode ray tube apparatus are as follows:

The projecting angles of the respective cathode ray tubes of the invention on the screen 3 are not much different, so that color shading barely appears in the color picture reproduced on the screen 3 even if a high screen gain screen is employed. Accordingly, a high gain screen can be used so that a color picture can be reproduced on the screen with high brightness and is good contrast relative to external light.

The adjustments, required when the convergence correction is carried out and the size of a picture is changed can be simplified from the view point of circuits or optical apparatus.

Since a two lens apparatus is sufficient, the cost of lenses is lower.

The advantages of the invention as compared with the prior art one lens, three cathode ray tube apparatus are as follows:

1. Since the light emitted from the cathode ray tubes of the invention are not reflected twice by the mirror or else does not pass through the mirrors twice, the image reproduced on the screen brighter. In the example of FIG. 1, the green color component emitted from the cathode ray tube 1G does not pass through the dichroic mirror 4B. It is pirmissible to interchange tube 1G with either of the tubes 1R or 1B, but the arrangement shown in FIG. 1 is advantageous for the reason that the green color component is high in visibility, so that if the green color is bright the brightness as a whole is advantageous as compared with the case where another color cathode ray tube is used as an independent one and the color component from this cathode ray tube is selected bright.

2. Furthermore, the dichroic mirror 4B can more easily separate the red and blue color components which have sufficiently disparate in wave lengths. Thus the dichroic mirror becomes easy to design and the loss of the red or blue color component intensity because of the dichroic mirror can a decreased to be minimum. In general, the spectral characteristic of a dichroic mirror is such that if light is incident thereon at an angle of 45°, the dichroic mirror shows an aimed spectral characteristic. If the incident angle deviates from 45°, the spectral characteristic is changed and a color shading may be caused by this change of the spectral characteristic. However, if the green cathode ray tube 1G is used independently as shown in FIG. 1, the spectral characteristic of the dichroic mirror 4B can be determined without regard to the green spectrum. Therefore, the dichroic mirror can have some freedom for the red and blue spectra, and a color shading resulting from a change in the spectral characteristic of the dichroic mirror 4B due to the deviation in the incident of light over the surface thereof can be reduced. In a color image projecting apparatus according to the present invention, undesired reflected light component from the dichroic mirror are reduced in comparison to the one lens, three cathode ray tube system so that deterioration of contrast of the picture by the reflected light components can be suppressed. Since there is no reflected green component, the invention is superior in this regard.

Figure 2:
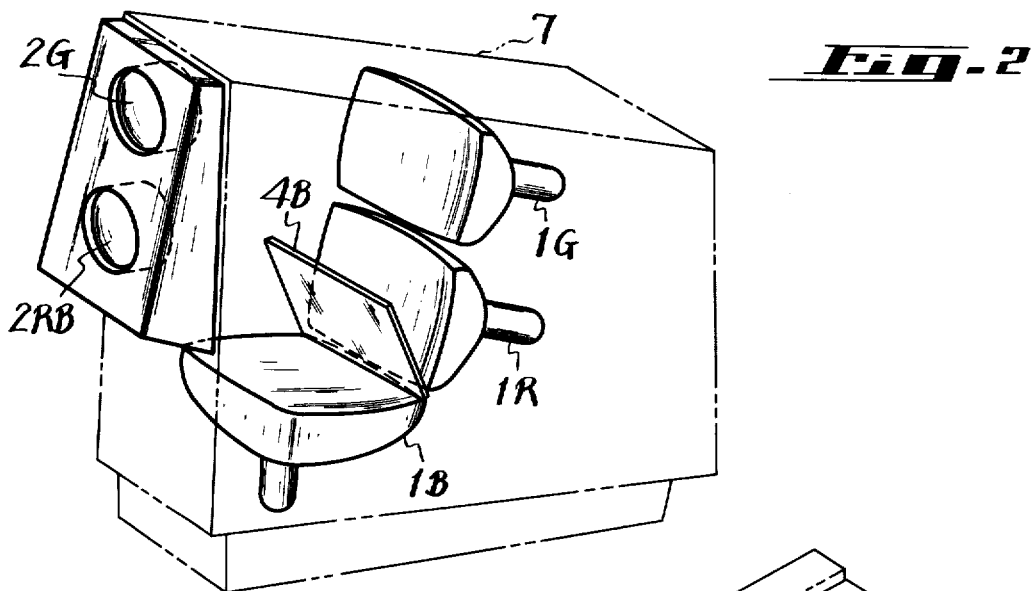
FIG. 2 is a schematic diagram showing an example of an arrangement of cathode ray tubes used in the invention.
Figure 3:
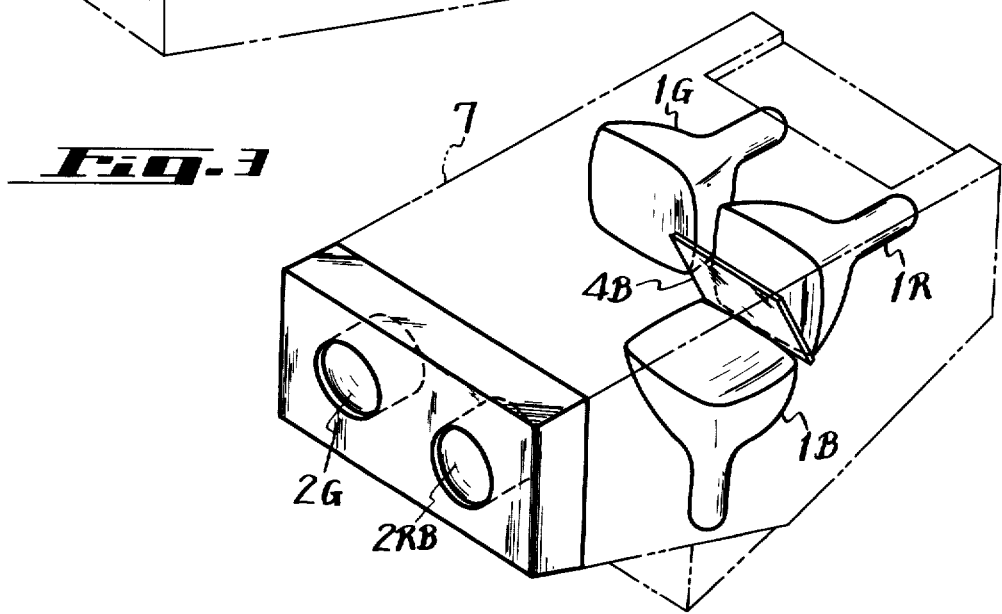
FIG. 3 is a schematic diagram showing another example of an arrangement of cathode ray tubes used in the invention.

FIGS. 2 and 3 show arrangements of the cathode ray tubes 1R, 1G and 1B in accordance with the invention.

In the example of FIG. 2, the lenses 2G and 2RB are located vertically in front of a case 7 (which is shown by the chain line in FIG. 2). The cathode ray tubes 1G and 1R are arranged vertically in a case 7 so that they face nearly in the same direction, and the cathode ray tube 1B is located under the cathode ray tube 1R facing in an upward direction.

In the example of FIG. 3, the lenses 2G and 2RB are located horizontally in front of the case 7. The cathode ray tubes 1G and 1R are arranged horizontally and facing in the same direction, and the cathode ray tube 1B is located under the cathode ray tube 1R with its picture face directed upwardly.

In the arrangements of the cathode ray tubes shown in FIGS. 2 and 3, the cathode ray tubes 1G and 1R are located to face nearly in same direction, so that cathode ray tubes 1G and 1R are subjected to the influence of terrestrial magnetism in the same direction. In general, when the convergence is disturbed, the green or red color component becomes most conspicuous. For this reaseon, in this embodiment of the invention the cathode ray tubes 1G and 1R are arranged to be similarly influenced by terrestrial magnetism so that the above defect is avoided.

Although the present invention is described in preferred embodiments, it will be apparent that many modifications and variations can be effected by one skilled in the art without departing from the spirit or scope of the novel concepts of the present invention as defined by the following claims.

We claim as our invention:

1. A color image projecting apparatus comprising: a first cathode ray tube for producing a first primary color image; first projecting lens means disposed in front of said first cathode ray tube and arranged to project said image along a first optical axis onto a screen; a second cathode ray tube for producing a second primary color image; a third cathode ray tube for producing a third primary color image and disposed at right angles to said second cathode ray tube; a dichroic mirror disposed in front of said second and third cathode ray tubes to receive said images in said second and third primary colors and synthesize therefrom a two color image; and second projecting lens means disposed to receive said two color image and project said two color image along a second optical axis intersecting said first optical axis at an acute angle at said screen, said two color image conforming in shape to said first primary color image projecting on said screen.

2. A color image projecting apparatus according to claim 1, wherein said first cathode ray tube produces a green image.

3. A color image projecting apparatus according to claim 2, wherein said second cathode ray tube produces a red image and said third cathode ray tube produces a blue image, and wherein said first cathode ray tube and said second cathode ray tube are disposed to face in substantially the same direction whereby said first and second cathode ray tubes are similarly influenced by terrestrial magnetism.

4. A color image projecting apparatus according to claim 1, in which said first optical axis intersects said screen at an angle other than 90 degrees, and said second optical axis intersects said screen substantially at an angle of 90°.

5. A color image projecting apparatus according to claim 1, in which said first cathode ray tube is disposed at a higher level than said second cathode ray tube, and said third cathode ray tube is disposed below and in front of said second cathode ray tube.

6. A color image projecting apparatus according ot claim 1, in which said first cathode ray tube is horizontally disposed with respect to said second cathode ray tube, and said third cathode ray tube is disposed below and in front of said second cathode ray tube.

* * * * *